(12) United States Patent
Kulkarni et al.

(10) Patent No.: US 8,099,564 B1
(45) Date of Patent: Jan. 17, 2012

(54) PROGRAMMABLE MEMORY CONTROLLER

(75) Inventors: Chidamber R. Kulkarni, Santa Clara, CA (US); Schulyer E. Shimanek, Albuquerque, NM (US); Kerry M. Pierce, Edmonds, WA (US); James A. Walstrum, Jr., San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 951 days.

(21) Appl. No.: 11/891,378

(22) Filed: Aug. 10, 2007

(51) Int. Cl.
*G06F 12/00* (2006.01)

(52) U.S. Cl. .......................... 711/154; 711/150; 716/16

(58) Field of Classification Search .................. 716/16; 711/154, 150
See application file for complete search history.

(56) References Cited

U.S. PATENT DOCUMENTS

| | | | | |
|---|---|---|---|---|
| 4,937,791 A * | 6/1990 | Steele et al. | ............. | 365/230.03 |
| 5,301,278 A * | 4/1994 | Bowater et al. | ..................... | 711/5 |
| 5,893,135 A * | 4/1999 | Hasbun et al. | ................. | 711/103 |
| 6,154,788 A * | 11/2000 | Robinson et al. | .................. | 710/8 |
| 6,157,978 A * | 12/2000 | Ng et al. | ....................... | 710/240 |
| 6,298,426 B1 * | 10/2001 | Ajanovic | ...................... | 711/172 |
| 6,334,174 B1 * | 12/2001 | Delp et al. | ..................... | 711/167 |
| 6,505,282 B1 * | 1/2003 | Langendorf et al. | .......... | 711/170 |
| 7,043,611 B2 * | 5/2006 | McClannahan et al. | ...... | 711/154 |
| 7,058,778 B2 * | 6/2006 | Swanson | ........................ | 711/170 |
| 2003/0115403 A1 * | 6/2003 | Bouchard et al. | ................. | 711/5 |
| 2003/0177229 A1 * | 9/2003 | Akasaka | ........................ | 709/224 |
| 2004/0088472 A1 * | 5/2004 | Nystuen et al. | .................... | 711/5 |
| 2004/0123036 A1 * | 6/2004 | Hammitt et al. | ............... | 711/131 |
| 2004/0133707 A1 * | 7/2004 | Yoshiya et al. | .................... | 710/6 |
| 2006/0018227 A1 * | 1/2006 | Nakajima | ..................... | 369/53.2 |
| 2007/0011409 A1 * | 1/2007 | Ingram et al. | .................. | 711/154 |
| 2008/0065239 A1 * | 3/2008 | Leinfellner et al. | ............ | 700/34 |
| 2008/0133848 A1 * | 6/2008 | Patel et al. | ..................... | 711/154 |

FOREIGN PATENT DOCUMENTS

WO   WO2005091089   *   9/2005

OTHER PUBLICATIONS

Leinfeller, "Infulencing Device for Control Apparatus", Machine Translation, Sep. 2005.*
"Developing High-Speed Memory Interfaces: The Lattice SCM FPGA Advantage" A Lattice Semiconductor White Paper, Feb. 2006, 13 pages, http://www.latticesemi.com/documents/memControl-SC.pdf.

* cited by examiner

*Primary Examiner* — Matthew Bradley
(74) *Attorney, Agent, or Firm* — Kevin T. Cuenot

(57) ABSTRACT

A memory controller implemented within a programmable integrated circuit can include a user interface having a command register and a plurality of data First-In-First-Out (FIFO) memories, wherein the command register can receive an address of a data FIFO memory of the plurality of data FIFO memories. A core controller coupled to the user interface can, responsive to an instruction from the user interface, generate control signals that initiate an operation within a memory device coupled to the core controller. A physical layer coupling with the core controller, the user interface, and the memory device can, responsive to a read operation of the memory device, store data received from the memory device within the selected data FIFO memory according to the address received in the command register.

20 Claims, 11 Drawing Sheets

200

| Parameter | Values |
|---|---|
| DRAM Type | Mobile SDRAM, mobile DDR, SDRAM, DDR, DDR2, DDR3 |
| Data width | 4, 8, 16 |
| Burst length | 1, 2, 4, 8 (and full page) |
| Burst type | Sequential, Interleaved |
| CAS latency | 2, 2.5, 3, 4, 5 (half latency not for DDR2) |
| Additive latency | 0, 1, 2, 3, 4 |
| Write recovery time | 2, 3, 4, 5, 6 |
| Output drive strength | On (SSTLx), off (reduced % of SSTLx) |
| RTT (on-die termination resistance value | 50 ohm, 75 ohm, 150 ohm |
| DQS# (differential DQS) | Enable differential DQS, Disable |
| TCSR (temperature compensated self refresh) | On (SSTLx), off (reduced % of SSTLx) |
| Arbitration scheme | TDMA, Single port, Interleave |
| User interface data FIFO width | 8, 16, 32 |

FIG. 2

(SDRAM)

(DDR)

(DDR2)

PROGRAMMABLE MEMORY CONTROLLER

FIELD OF THE INVENTION

The embodiments disclosed herein relate to the field of electronic circuit design and, more particularly, to a programmable memory controller.

BACKGROUND

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

The flexibility and computing power offered by modern PLDs has lead to increased usage of these devices in a variety of different systems. For example, PLDs are used extensively in networking and communication related systems. Increasingly, these sorts of systems, as well as others, are implemented using circuits that rely upon dynamic random access memory (DRAM). Accordingly, these systems need memory controllers to facilitate communication between the various system components and the DRAM(s). A memory controller, in general, refers to a system (or a subsystem) that includes circuitry that can read data from DRAM, write data to DRAM, refresh DRAM to avoid loss of data, as well as perform other administrative functions that may be required to communicate with the DRAM.

SUMMARY

The present invention relates to a programmable memory controller. One embodiment of the present invention can include a memory controller implemented within a programmable logic device (PLD). The memory controller can include a user interface having a command register and a plurality of data First-In-First-Out (FIFO) memories. The command register can receive a first address of a data FIFO memory of the plurality of data FIFO memories. The memory controller further can include a core controller coupled to the user interface. Responsive to an instruction from the user interface, the core controller can generate control signals that initiate an operation within a memory device coupled to the core controller. The memory controller also can include a physical layer that couples with the core controller, the user interface, and the memory device. Responsive to a read operation of the memory device, the physical layer can store data received from the memory device within a first data FIFO memory selected from the plurality of data FIFO memories according to the first address.

Responsive to a write operation of the memory device, the physical layer of the memory controller can read data from a second data FIFO memory selected from the plurality of data FIFO memories according to a second address received in the command register. The physical layer can write the data into the memory device. A plurality of input/output blocks (IOBs) of the PLD can be selectively available for use by either the memory controller or a user-circuit design implemented within the PLD.

The user interface further can include at least one configuration register or memory cells that specify a type of the memory device. The core controller can select, from a plurality of state machines, a state machine associated with the type of memory device specified and can execute the selected state machine.

The command register can include an acknowledgement bit that is set according to whether a write operation that writes data from a second selected data FIFO memory of the plurality of data FIFO memories to the memory device is successful. The core controller can send an acknowledgement message to the second selected data FIFO memory responsive to the acknowledgement bit of the command register indicating a successful write operation to the memory device.

For each read operation of the memory device, the physical layer can store data from the memory device within one of the plurality of data FIFO memories according to an address stored in the command register for each respective read operation. In one embodiment, the address stored in the command register can be determined according to a static switching table stored in configuration memory cells. In another embodiment, the address stored in the command register can be dynamically determined during operation of the memory controller.

Another embodiment of the present invention can include a memory controller implemented within a PLD. The memory controller can include a user interface having a plurality of data FIFO memories and a debug interface. The debug interface can include at least one output register specifying state information for at least one component of the memory controller during operation of the memory controller. The memory controller also can include a core controller coupled to the user interface, wherein responsive to an instruction from the user interface, the core controller generates control signals that initiate an operation within a memory device coupled to the core controller.

A physical layer can be coupled to the core controller, the user interface, and the memory device. Responsive to receiving data from the memory device, the physical layer can store the data within a data FIFO memory selected from the plurality of data FIFO memories indicated by the user interface. The memory controller can be implemented as a hard block within the PLD. In another embodiment, a plurality of IOBs of the PLD can be multiplexed to selectively connect with either the memory controller or a user-circuit design implemented within the PLD.

The output register(s) can specify an address of the selected data FIFO memory. The core controller can implement a state machine that is selected according to a configuration register in the user interface. The output register(s) can specify a current state of the state machine implemented by the core controller.

The output register(s) also can specify a measure of an average amount of time for accessing the memory device. The output register(s) further can specify a measure of time before a selected access of the memory device is completed. The output register(s) also can specify at least one address listed in an open row management module of the memory device.

The debug interface can include an input register that can receive a value. The output register(s) can specify at least one item of state information that is selected according to the value received in the input register of the debug interface.

Another embodiment of the present invention can include a memory controller implemented within a PLD. The memory controller can include a user interface having a command register receiving instructions and a core controller coupled to the user interface. Responsive to an instruction from the user interface, the core controller can generate control signals that initiate an operation within a memory device coupled to the core controller. The memory controller also can include a physical layer that couples to the core controller, the user interface, and the memory device and at least one Block Random Access Memory (BRAM). The BRAM(s) can include at least three ports, wherein a first one of the at least three ports is directly coupled to the physical layer of the memory controller through a memory controller bus. Data exchanged with the memory device can flow through the memory controller bus between the BRAM and the physical layer while bypassing the user interface.

The memory controller can be implemented as a hard block within the PLD. The second port(s) and the third port(s) of the BRAM can connect with a user-circuit design implemented within the PLD. A plurality of IOBs of the PLD can be multiplexed to selectively connect with either the memory controller or a user-circuit design implemented within the PLD.

BRIEF DESCRIPTION OF THE DRAWINGS

FIG. 2 is a table illustrating programmable parameters of the memory controller depicted in FIG. 1 in accordance with another embodiment of the present invention.

DETAILED DESCRIPTION OF THE DRAWINGS

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the invention.

The embodiments disclosed herein relate to a memory controller that can be implemented within a programmable logic device (PLD). The memory controller can be implemented as a "hard" block within a PLD, such as a field programmable gate array (FPGA). Though implemented as a hard block, the memory controller can be programmed to perform a variety of different functions and interact with a plurality of different types of memory devices. The memory controller further offers switching functionality which, through load balancing, increases bandwidth utilization of the memory controller.

In one embodiment, a debug interface can be included in the memory controller. The debug interface can provide information relating to one or more operational parameters of the memory controller. The information can be dynamically updated and made available during operation of the memory controller. An input register portion of the debug interface can provide a user-circuit design with the ability to specify which parameters are to be made available via the debug interface. Though the memory controller can be programmed for particular behavior prior to runtime, a user-circuit design, or other system, can read information available in the debug interface and use that information to adapt to changing conditions in the system, as well as within the memory controller itself, during operation.

Figure 1:
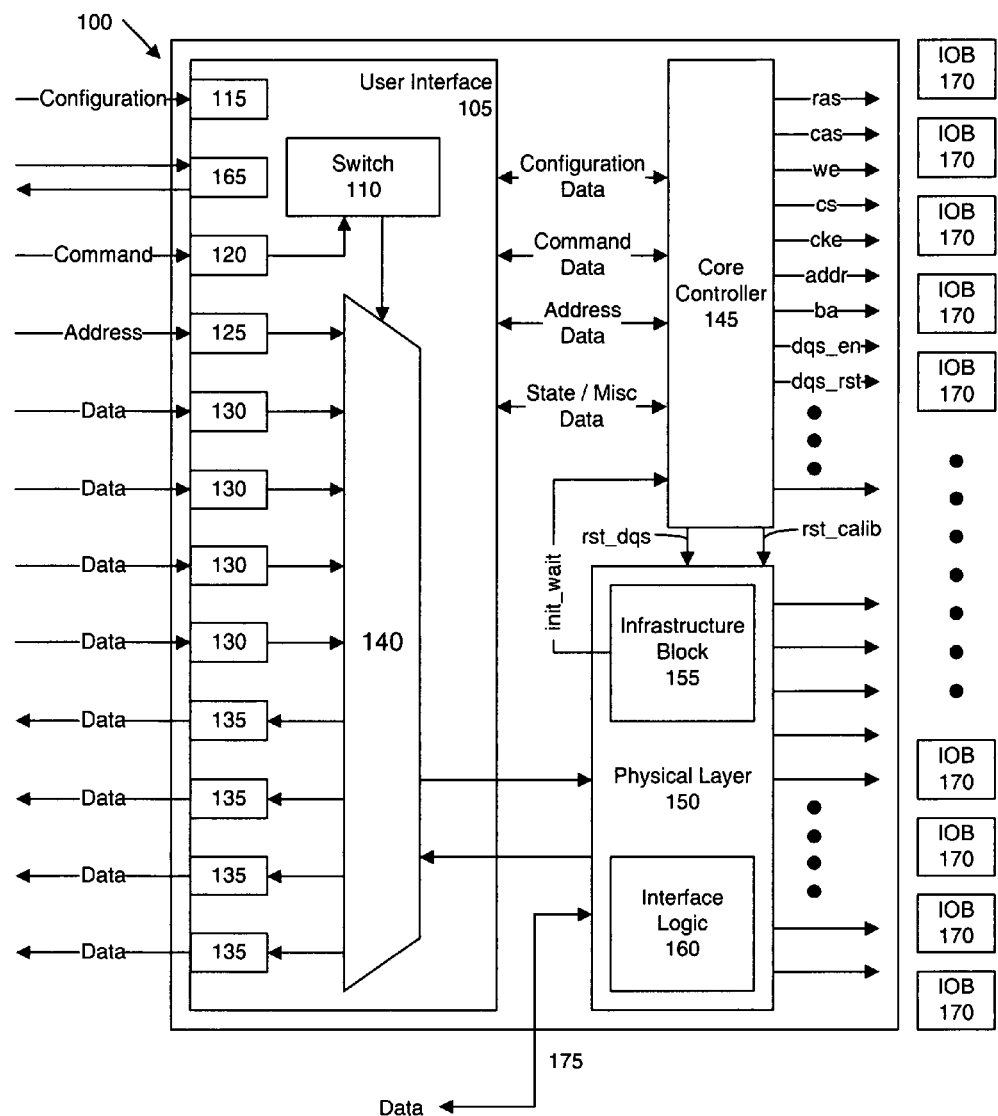
FIG. 1 is a block diagram illustrating a memory controller in accordance with one embodiment of the present invention.

FIG. 1 is a block diagram illustrating a memory controller 100 in accordance with one embodiment of the present invention. The memory controller 100 can be implemented within a PLD, for example, an FPGA. As noted, the memory controller 100 can be implemented as a hard block within the PLD. A "hard block", as used herein, refers to a dedicated block or portion of circuitry within a PLD as opposed to, for example, the programmable fabric of the PLD, which can be programmed to implement virtually any digital function. However, one or more aspects of the memory controller 100, as will be described herein, can be programmed prior to, and/or during, operation of the memory controller 100. In this regard, the memory controller 100 can be said to be dynamically configurable or dynamically programmable.

The memory controller 100 allows one or more circuits or systems to interface with a memory device and, in particular, a dynamic random access memory (DRAM). As used herein, a "DRAM" can refer to a memory device configured according to one of the following protocols, or referred to by one of the following names, mobile synchronous DRAM (SDRAM), SDRAM, mobile double data rate (DDR), DDR, DDR2, DDR3, and the like.

Referring again to FIG. 1, the memory controller 100 can include a user interface 105, a core controller 145, and a physical layer 150. The user interface 105 can be configured to receive or process a variety of different signals. For example, the user interface 105 can receive a configuration signal, a command signal, an address signal, and/or one or more data signals. (Note that in the present specification, the same reference characters are used to refer to terminals, signal lines, and their corresponding signals.) The user interface 105 further can provide one or more data signals. The configuration signal can be received by the user interface 105 and can be provided to a configuration register 115. The configuration register 115 can be loaded via the configuration signal and can control the configuration of the memory controller 100. The available configuration options for the memory controller 100 are described in greater detail with reference to FIGS. 2 and 3. As noted, one or more operational parameters of the memory controller 100 which can be set according to the configuration register can be set prior to runtime as well as during operation of the memory controller 100.

The command signal can be received by the user interface 105 and can be stored in a command register 120 that can be implemented, for example, as a First-In-First-Out (FIFO) memory. The command signal can specify read, write, and/or mode register change commands which can be buffered in the command register 120. The command register 120 can be coupled to a switch 110, which further can be coupled to a multiplexer 140. The command stored in the command register 120 and provided to the switch 110 can determine, or can be used to select, which data lines are passed through the multiplexer 140 as well as the direction of data to be passed through the multiplexer 140, e.g., to or from the physical layer 150.

The address signal also can be received by the user interface 105. The address signal can be coupled to the address register 125. A plurality of data lines lead into and out of the user interface 105 via data FIFOs. Incoming data lines are coupled to the input data FIFOs 130. Outgoing data can be stored or made available via the output data FIFOs 135. Data that is read from a DRAM coupled to the memory controller 100 during a read operation can be stored within a particular one of the output data FIFOs 135. The address signal can specify the address of the particular data FIFO, e.g., selected from data FIFOs 130 or data FIFOs 135, from which data is to be read or to which data is to be written. For example, the particular output data FIFO 135 in which data obtained from the DRAM coupled to the memory controller 100 is stored can be indicated by the address specified by, or stored within, the address register 125. The address within the address register 125 can be dynamically updated during operation of the memory controller 100 to facilitate load balancing among the various data FIFOs 130 and/or 135.

The user interface 105 further can include a debug interface 165. The debug interface 165 can provide a register-based interface through which information about the status of internal blocks, or components, of the memory controller 100 can be provided. The debug interface 165 can be accessed by any of a variety of different mechanisms, whether such mechanisms are implemented within the same PLD in which the memory controller 100 is implemented or are located "off-chip", e.g., not on the same PLD in which the memory controller 100 is implemented.

The information provided by the debug interface 165 allows the memory controller 100 to be tuned dynamically during operation. For example, the information available via the debug interface 165 can include statistical information supporting more efficient usage of the data FIFOs 130 and 135. In another example, the information provided through the debug interface 165 also supports re-ordering of memory accesses to be performed during runtime.

The user interface 105 can control the core controller 145 by providing various control signals including, but not limited to, those pictured in FIG. 1. For example, the user interface 105 can exchange configuration information, command information, and address information relating to FIFO and DRAM addresses with the core controller 145. Further information such as state information and debugging information can be exchanged between the user interface 105 and the core controller 145 as well. Responsive to instructions provided from the user interface 105, e.g., via the control signals, the core controller 145 can generate control signals to initiate actions or operations within the DRAM coupled to the memory controller 100. For example, the core controller 145 can generate read, write, initialization, and/or control signals, including, but not limited to, mode register access, precharge, and the like, to interface with a DRAM.

In one embodiment, the core controller 145 can have a synchronous single port interface to the user interface 105. To communicate through the synchronous single port interface, the user interface 105 can be configured in accordance with several requirements. For example, when a write (burst) access begins, data can be made readily available without any flow control. When a read (burst) access begins, the user interface 105 (or the user-circuit connected thereto) can ensure that sufficient buffer space exists in the data FIFOs 135 to buffer data received from the DRAM, as the user interface 105 can be configured not to ask the core controller 145 to pause within a single (burst) access. In addition, the core controller 145 and the physical layer 150 each can be configured not to buffer data. Buffering can occur in the user interface 105. Accesses can be executed by the core controller 145 in the order presented by the user interface 105.

The core controller 145 can generate signals such as, for example, row address strobe (RAS) signals, column address strobe (CAS) signals, chip select (CS) signals, clock enable (CKE) signals, write enable (WE) signals, address (ADDR) signals, bank address (BA) signals, delayed version of the enable signal (DQS_EN) signals, and data strobe reset (DQS_RST) signals. These signals can be provided, for example, to input/output blocks (IOBs) of the PLD upon which the memory controller 100 is implemented, with the IOBs being coupled to the appropriate pins or connections of a DRAM.

The core controller 145 can be programmed to instruct the DRAM to perform various initialization sequences for one or more different DRAM memory standards. For example, the core controller 145 can be configured to follow the state transitions for read and write accesses for the particular DRAM standard that is specified in the configuration register 115. The core controller 145 also can generate appropriate signals to control the physical layer 150 including, but not limited to, DQS_RST and various internal memory controller signals, such as RST_CALIB, that can be used to calibrate the datastrobe signals.

The physical layer 150 can include an infrastructure block 155 and interface logic 160. The infrastructure block 155 can be implemented, for example, using known blocks of the PLD such as, for example, DCMs, IDELAYs, IOBs 170, and/or a calibration circuit. These functions or blocks are known to the skilled artisan and, further, are available as primitives within commercially available synthesis tools for FPGA devices such as those available from Xilinx, Inc. of San Jose, Calif. In other embodiments, the memory controller is implemented as a hard block.

The infrastructure block 155 of the physical layer 150 can provide an "INIT_WAIT" signal to the core controller 145. A calibration circuit within the infrastructure block 155 can control the state of the INIT_WAIT signal. The core controller 145 will not progress to a next state until the calibration circuit completes calibration function(s) as indicated by the INIT_WAIT signal. The interface logic 160 can provide connectivity between the memory controller 100 and selected ones of the IOBs 170 of the PLD within which the memory controller 100 is implemented. The interface logic 160 can connect with data and strobe signals of the DRAM to facilitate safe data capture from the DRAM. The strobe signals from the DRAM can be used to delay the data capture from the input/output pins of the DRAM, thereby providing the required setup time for the data to be registered in the fabric of the PLD.

In one embodiment, one or more data lines 175 can be coupled with the physical layer 150 through which data can be output from the physical layer 150 or provided to the physical layer 150. The data lines 175 can bypass the multiplexer 140 and the user interface 105. The data lines 175 can be used to interface directly with one or more Block Random Access Memories (BRAMs), as will be discussed herein in greater detail with reference to FIGS. 12 and 13.

Under the control of the core controller 145, data can be passed from the DRAM to selected IOBs 170, through the physical layer 150 to the user interface for storage in a selected output data FIFO 135. Similarly, data can be obtained from an input data FIFO 130 and passed through the physical layer 150, under the control of the core controller 145, to be stored in the DRAM coupled to the memory controller 100.

In one embodiment of the present invention, a select number of IOBs of the PLD in which the memory controller 100 is implemented, shown here as IOBs 170, can be made available for use by the memory controller 100. Rather than being dedicated for use only with the memory controller 100, these IOBs 170 can be selectively connected to the fabric of the PLD or to the memory controller 100. Based upon whether the memory controller 100 is used with a user-specified design and the number of IOBs needed by the memory controller 100 when used, an Electronic Design Automation (EDA) tool that generates a bitstream that programs the PLD including the memory controller 100 can program switches, e.g., multiplexers, coupled to the IOBs 170. This programming from the bitstream selects which of the IOBs 170 will be connected to the memory controller 100 and which will be connected to the fabric of the PLD.

Not all IOBs of the PLD including the memory controller 100 need be configured with this switching capability. Some IOBs can be implemented in the conventional manner, such that those IOBs are available only for use by the fabric of the PLD, and not the memory controller 100. Limiting the number of IOBs available to the memory controller 100 can save space, as the multiplexing circuitry needed for linking the IOB to either the memory controller 100 or the PLD fabric is not needed for each IOB. That is, the switching capability is not needed for those IOBs that are available only to the fabric of the PLD.

In any case, the number of IOBs 170 available for use by the memory controller 100 can vary. In one embodiment, a bank of IOBs can be implemented with switching functionality and, thus, be made selectively available for use by the memory controller 100. In another embodiment, a predetermined number of IOBs, e.g., less than the total number of IOBs on the PLD, can be made available with switching functionality.

FIG. 2 is a table 200 illustrating configurable parameters of the memory controller depicted in FIG. 1 in accordance with another embodiment of the present invention. The table 200 illustrates exemplary parameters of the memory controller, and possible values for such parameters, that can be set by a user or user circuit design. For example, the parameters shown in table 200 can be set using the configuration register illustrated in FIG. 1 within the user interface. As noted, these parameters and values can be provided from the user interface to the core controller, thereby instructing and/or configuring the core controller for proper operation with respect to a selected type of DRAM.

As shown, a particular DRAM type, e.g., mobile SDRAM, SDRAM, mobile DDR, DDR, DDR2, or DDR3 can be selected. The selection of a DRAM type in the configuration register selects the particular state machine that is implemented by the core controller to interface with a DRAM. In one embodiment, one or more of the parameters illustrated in table 200 can be configured via a bitstream specifying a user design. In that case, the configuration information can be stored within, and accessed from, memory cells of the PLD including the memory controller. In another embodiment, the memory cells can be dynamically reconfigured, e.g., to dynamically change the operational parameters of the memory controller including DRAM type, using a partial reconfiguration technique for the PLD. Further, one or more of the parameters of table 200 also can be changed or updated dynamically during operation of the memory controller, e.g., via the command register of the user interface.

For example, a reset of the memory controller can be performed. Depending upon the reset option selected, a reset of the memory controller need not reset the DRAM coupled to the memory controller. In another example, though the memory controller of FIG. 1 was illustrated as having four input data FIFOs and four output data FIFOs, the number of input and/or output data FIFOs can be changed during operation, e.g., to two input data FIFOs and four output data FIFOs. The arbitration scheme implemented by the user interface also can be selected to be Time Division Multiple Access (TDMA), rate based scheduling, weighted scheduling, interleaved, or the like. In one embodiment, the arbitration scheme can be dynamically changed during operation of the memory controller.

Figure 3:
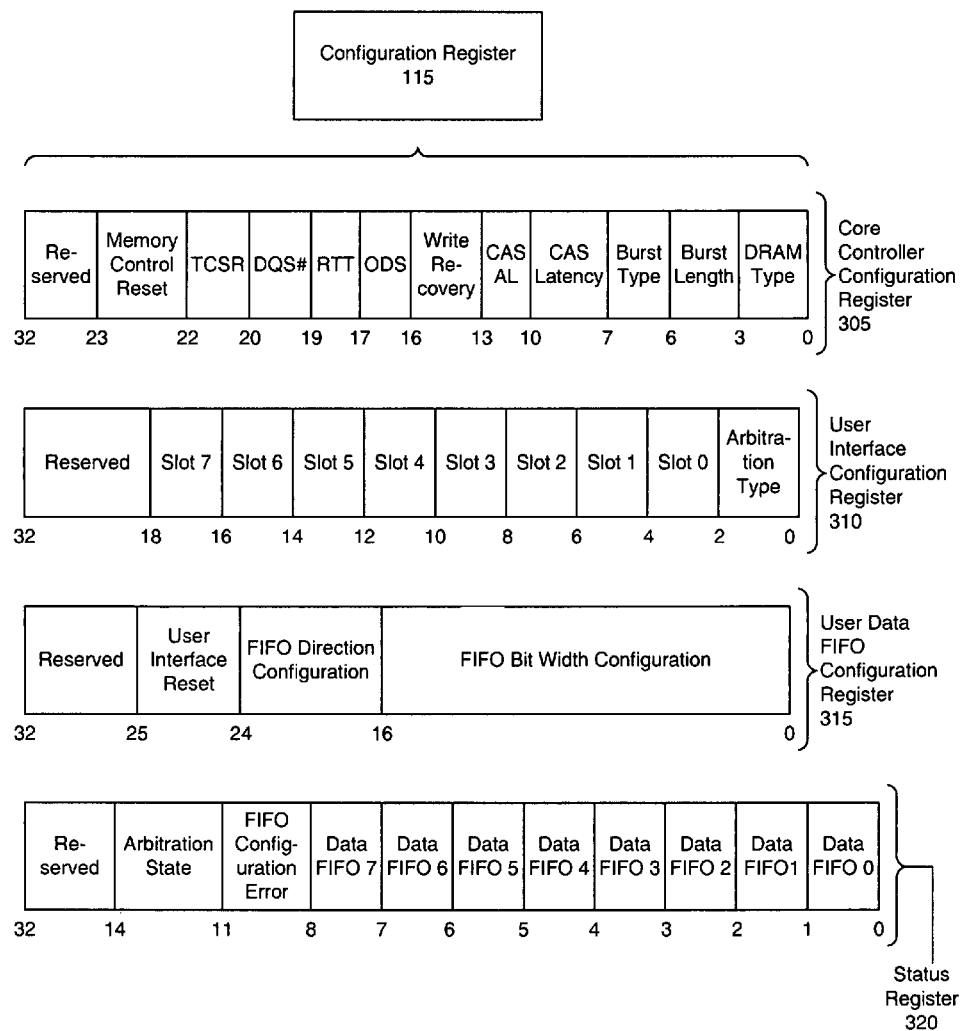
FIG. 3 is a diagram illustrating a mapping of the configuration register of FIG. 1 in accordance with another embodiment of the present invention.

FIG. 3 is a diagram illustrating a mapping of the configuration register 115 of FIG. 1 in accordance with another embodiment of the present invention. The configuration register 115 allows a user, or a user-circuit design, to specify various operating parameters of the memory controller, e.g., those parameters illustrated in FIG. 2. The configuration register 115 can include a plurality of registers. In the pictured embodiment, the configuration register 115 can include a core controller configuration register 305, a user interface configuration register 310, a user data FIFO configuration register 315, and a status register 320. Each of the registers can be 32 bits in width, for example, as pictured in FIG. 3. The relative bit position of each portion of the registers 305, 310, 315, and 320 is shown below each respective register.

The core controller configuration register 305 can specify the configuration to be implemented within the core controller, including the DRAM type with which the core controller will be interacting. To re-enter the initialization sequence, the memory control reset located at bit 22 of the core controller configuration register 305 can be set. Setting the memory control reset causes the DRAM to be initialized.

The user interface configuration register 310 can determine various operational parameters of the user interface. For example, the user interface configuration register 310 can specify the arbitration scheme, e.g., TDMA, interleaved, rate based scheduling, weighted scheduling, or the like, that is to be used by the user interface. The user interface configuration register 310 further can specify the TDMA slots for each data FIFO.

In the user interface configuration register 310, each data FIFO can have a corresponding programmable time slot. This time slot can be configured to specify a number of consecutive time slots that the core controller should read data from and/or write data to for each respective data FIFO. For example, a value of 0101010110101111 can indicate that three time slots for data FIFO 0 and data FIFO 1, two time slots for data FIFO 2 and data FIFO 3, and one time slot for each of the remaining data FIFOs are to be read or written consecutively. With this value, the user interface can be configured to implement time multiplexing type arbitration with an overall time frame of 14 time slots. Thus, a maximum of 24 time slots can be programmed. One time slot can be equal to the number of cycles required to read and/or write one burst size of data.

The FIFO Bit Width Configuration located at bits 0-15 of the user data FIFO configuration register 315 can specify the different bit widths to be used by the data FIFOs of the user interface. The FIFO Direction Configuration located at bits 16-23 of the user data FIFO configuration register 315 can specify the direction of each respective data FIFO of the user interface. The user interface reset indicator located at bit 24 can control whether the debug interface and any other state inside the memory controller will be reset. Setting this bit causes the memory controller to re-enter the initialization sequence. The memory controller can be reset while the DRAM coupled to the memory controller is not reset and continues uninterrupted operation.

The status register 320 can provide information relating to errors and the status of various parts of the memory controller. For example, the memory controller may experience a condition in which data is to be written to a full data FIFO. To write data to the selected data FIFO, a word must be dropped. The error bit of the status register 320 that corresponds to the data FIFO to which data is to be written (e.g., bit positions 0-7 corresponding to data FIFO 0-data FIFO 7) can be set to high. The data FIFO bits of the status register 320 cannot be reset unless the user interface reset bit in the user data FIFO configuration register is set.

The FIFO configuration error located at bits 8-10 indicates whether an unsupported data FIFO configuration was attempted. For example, if interleave arbitration is specified in the arbitration type of the user interface configuration register 310 and nonconsecutive read and write data FIFOs are specified, an error will result. This error can be specified in the FIFO configuration error of the status register 320. The arbitration state of the user interface, e.g., which data FIFO is currently being serviced, can be specified in the arbitration state located at bits 11-14 of the status register 320.

Figure 4:
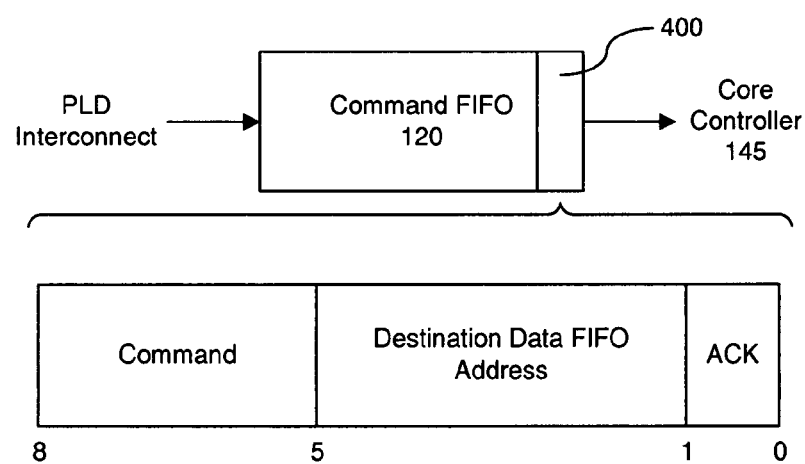
FIG. 4 is a diagram illustrating a mapping of the command First-In-First-Out of FIG. 1 in accordance with another embodiment of the present invention.

FIG. 4 is a diagram illustrating a mapping of the command register 120 of FIG. 1 in accordance with another embodiment of the present invention, in which command register 120 is implemented as a FIFO. The command FIFO 120, as described, is disposed within the user interface of the memory controller and buffers received commands. In one embodiment, the command FIFO 120 can be large enough to store a plurality of command FIFO entries. For example, command FIFO entry 400 of the command FIFO 120 can have a structure as pictured in FIG. 4.

The command FIFO entry 400 can be a word, which can include an acknowledgement (ACK) flag at bit position 0, a destination data FIFO address from bits 1-4, and a command located at bits 5-7. The command portion of the command FIFO entry 400 can specify the particular operation to be initiated within the DRAM coupled to the memory controller. For example, such operations can include, but are not limited to, a read, a write, or the like. As noted, the particular sequence of signals needed to initiate an operation can be determined in accordance with the state machine that is selected and implemented by the core controller 145.

The ACK can be set or cleared according to whether a write operation is successful. More particularly, the ACK can be set according to whether data is successfully written into the DRAM coupled to the memory controller. Based upon the status of the ACK, the core controller 145 can provide a notification to the data input FIFO of the user interface from which data was obtained and written into the DRAM. The notification can be provided or sent only responsive to a successful write operation to the DRAM, only responsive to an unsuccessful write operation to the DRAM, or responsive to each write operation to the DRAM with the notification indicating either success or failure.

The destination data FIFO address specifies the particular FIFO, or the address of the particular FIFO, to which requested data is to be written by the core controller 145. The user, via a user-specified circuit coupled to the memory controller, can specify the address information. This allows the memory controller to provide switch-like functionality in that the particular data FIFO that is used to store data received from the DRAM coupled to the memory controller, e.g., responsive to a read operation, can be selected and dynamically changed during operation of the memory controller.

In one embodiment, the address information provided to the command register 120 can be determined when the user-circuit is designed. For example, the addressing can be statistically determined utilizing a round-robin type of assignment between the various data output FIFOs of the user interface. In illustration, address information can be provided to the command register 120 by a pre-defined state machine, e.g., a switching table specifying time slot allocations that can be stored in configuration memory cells and/or registers of the PLD including the memory controller. The predefined state machine can continuously generate destination bits, e.g., destination data FIFO addresses, to be included in the command register entry or entries. In another illustration, an entry in a table including a plurality of entries can be read by the core controller 145.

In another embodiment, the address information can be dynamically provided to the command register during operation of the circuit design according to application requirements occurring in real time. For example, user logic, whether programmable logic, a processor, etc., can generate the destination data FIFO address based upon information occurring in real time, e.g., information from the status register of the configuration register or the debug interface.

Dynamic selection of data FIFOs through the destination data FIFO address facilitates load balancing with respect to the user interface portion of the memory controller. Load balancing can achieve a more efficient use of available memory controller bandwidth. It should be appreciated that if a predetermined assignment of data to data FIFOs is determined at the time a circuit is designed, a processor or other suitable circuitry can still be used to provide a command to the command register to update the switching information, e.g., destination data FIFO address, at virtually any time during operation or runtime of the memory controller.

Figure 5:
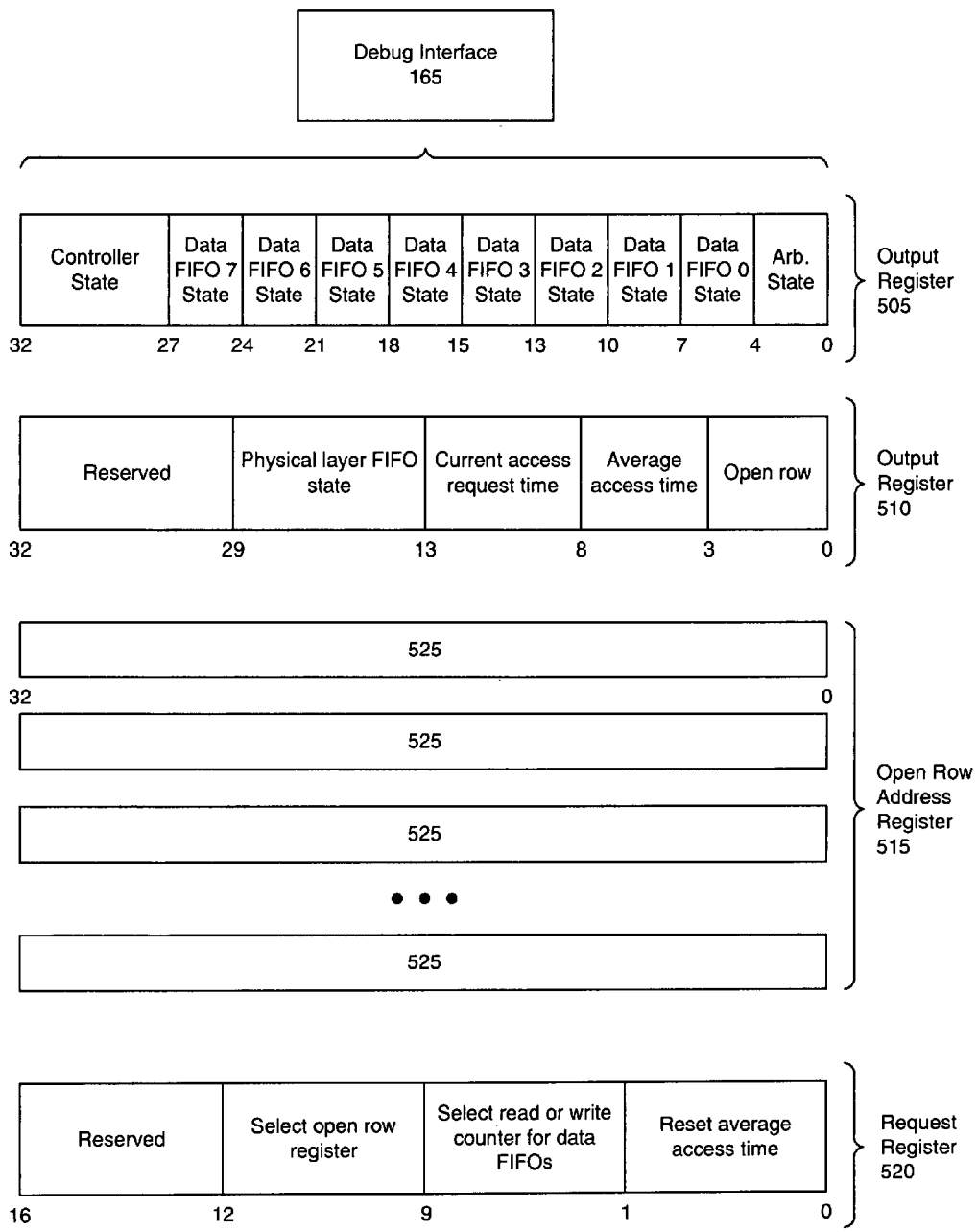
FIG. 5 is a diagram illustrating a mapping of the debug interface of FIG. 1 in accordance with another embodiment of the present invention.

FIG. 5 is a diagram illustrating a mapping of the debug interface 165 of FIG. 1 in accordance with another embodiment of the present invention. The debug interface 165 can include a plurality of registers. In one embodiment, the debug interface 165 can include one or more readable (output) registers and one or more writeable (input) registers. In the embodiment pictured in FIG. 5, the debug interface 165 can include an output register 505, an output register 510, and another output register referred to as the open row address register 515. The various items of information specified in the output registers 505, 510 and 515 can be obtained from, and updated by, the core controller. The debug interface 165 further can include an input register referred to as the request register 520. The bit positions of the various indicators discussed herein with reference to FIG. 5 are denoted below each respective register.

The output register 505 can include an arbitration state indicator, a plurality of FIFO state indicators corresponding to data FIFO 0-data FIFO 7, and a controller state indicator. The arbitration state indicator can specify the address of the data FIFO that is currently being serviced within the user interface. Each of the FIFO state indicators can specify the state of either the read or the write counter for the particular data FIFO associated with that indicator. The controller state indicator can specify the current state of the state machine operating in the core controller. For example, the controller state indicator can specify whether the core controller is performing an action related to a current data transfer, or access of the DRAM, or is performing a control action in preparation for a future read or write access of the DRAM.

The output register 510 can include an open row indicator, an average access time indicator, a current access request time indicator, a physical layer FIFO state indicator, and a reserved portion. The open row indicator can specify the number of rows of the DRAM that are currently open. The number of open rows in the DRAM coupled to the memory controller, as well as the address of such rows, is tracked within the state machine executing within the core controller.

The user interface of the memory controller can include a state machine that tracks when data is requested from, or written to, the DRAM as well as when a given access is available in the user interface, e.g., requested data has been written to the selected data FIFO and is available for use. The user interface can calculate an average access time from the information stored and tracked by the state machine. The average access time that is calculated can be generic in that the average access time can refer to both read and write accesses. The counter can be reset via the reset average access time bit in the request register 520.

The current access request time indicator can specify the number of cycles needed for a particular access to be completed. For example, a particular access of interest, e.g., a read or a write, can be specified in the command register. Based upon the size of the value specified by the current access request time indicator, another process or system, e.g., user logic, can determine whether to perform one or more other tasks while waiting for the specified number of cycles to pass. The process or system can return after the number of cycles specified in the current access request time indicator have elapsed to access the desired data.

The physical layer FIFO state indicator can indicate whether data FIFOs of the physical layer have overflowed. Data FIFOs in the physical layer of the memory controller (not shown) can be used to buffer data being written to, or received from, the IOBs of the PLD and, thus, the DRAM. An overflow condition with respect to the data FIFOs in the physical layer can indicate that the core controller has dropped bits as a result of the overflow condition. Bits 29-31 can be reserved for future use.

The open row address register 515 can specify one or more addresses 525 that are present, or listed, in the open row management module of the DRAM connected to the core controller. The values specified in the open row registers are addresses of the rows of the DRAM that are kept open within the memory controller due to spatial access properties. This information can be leveraged by a state machine or a processor, for example, within the fabric of the PLD within which the memory controller is implemented, to further optimize the data access patterns for access latency.

For example, the core controller is aware of whether a given address, e.g., a row address in the DRAM, is already open. An open address has less latency than a closed address. As such, the core controller can include logic that can calculate an amount of latency for a given access of the memory device. This calculation can rely upon whether an address being accessed is open or closed. In any case, the core controller can compute a current access request time as well as an average access time. Both quantities can be specified in terms of clock cycles and be communicated to the user interface, e.g., the debug interface 165.

The request register 520 allows portions of a user-circuit design to specify the particular type of information to be specified, or made available, via the output registers 505, 510, and/or 515 of the debug interface 165. The reset average access time determines whether the average access time value specified in the average access time indicator of the output register 510 will be reset. Setting the reset average access time indicator in the request register 520 results in the clearing of any existing counter values for the average access time indicator in the output register 510. The counter begins counting again after being reset.

The select read or write counter for data FIFOs, occupying bits 1-8, can determine whether the values of the read counters or write counters of the data FIFOs in the user interface are presented in the respective FIFO state indicators (data FIFO 0 state-data FIFO 7 state) of the output register 505. The select open row register in bits 9-11 can determine which open row register value, e.g., which of the addresses 525, is to be made available via the open row address register 515.

The particular bitwise locations of different indicators and writable portions of registers, as pictured in the register mappings, disclosed herein have been provided for purposes of illustration. As such, the embodiments disclosed herein are not intended to be limited to one particular mapping for a particular register or to suggest that a particular portion of a register, e.g., an indicator, is limited to a particular number of bits.

Figure 6:
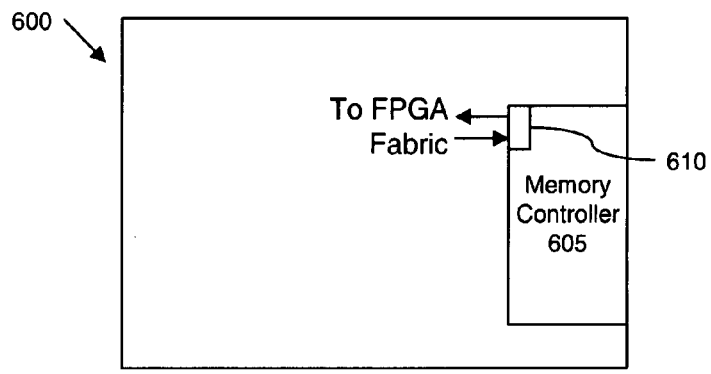
FIG. 6 is a block diagram illustrating an exemplary implementation of a memory controller having a debug interface disposed on a programmable logic device (PLD) in accordance with another embodiment of the present invention.

FIG. 6 is a block diagram illustrating an exemplary implementation of a memory controller having a debug interface in accordance with another embodiment of the present invention. As shown, a PLD 600, such as an FPGA, can include a memory controller 605 as disclosed herein. The memory controller 605 can include a debug interface 610 which can be accessed by various circuit elements or systems implemented in the fabric of the PLD 600. Debug interface 610 can be, for example, the same as debug interface 165 in FIG. 1. In this embodiment, the interconnect fabric of the PLD 600 can be used to couple the debug interface 610 with particular elements of a user-circuit design implemented within the PLD. For example, within the pictured embodiment, a state machine or a processor operating within the fabric of the PLD 600 can access the debug interface 610. Responsive, at least impart, to information obtained from the output registers of the debug interface 610, the configuration information, address information, etc. that is written to the user interface of the memory controller can be dynamically changed and/or updated during operation of the memory controller.

Figure 7:
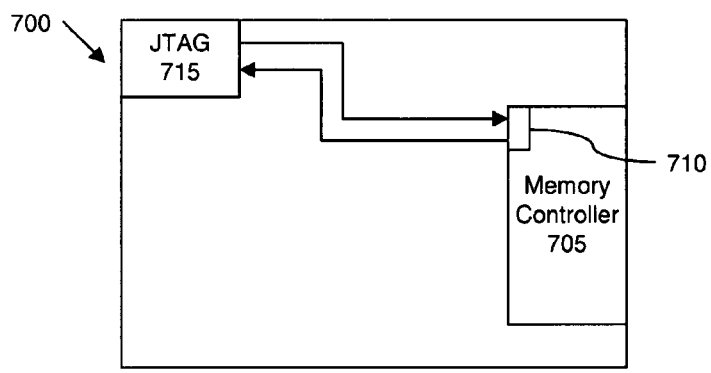
FIG. 7 is a block diagram illustrating an exemplary implementation of a memory controller having a debug interface disposed on a PLD in accordance with another embodiment of the present invention.

FIG. 7 is a block diagram illustrating an exemplary implementation of a memory controller having a debug interface in accordance with another embodiment of the present invention. In the embodiment pictured in FIG. 7, a memory controller 705 having a debug interface 710 can be implemented within a PLD 700. Debug interface 710 can be, for example, the same as debug interface 165 in FIG. 1. The debug interface 710 can be coupled to a Joint Test Action Group (JTAG) interface 715. As is well known, a JTAG interface is an interface that is compliant with the IEEE 1149.1 standard to provide control and pin monitoring of a compliant device on a printed circuit board. In one embodiment, the debug interface 710 and the JTAG interface 715 can be coupled through dedicated routing, e.g., wires, of the PLD 700. Accordingly, a system or circuit implemented "off-chip" with respect to the PLD can access the debug interface 710 and dynamically update configuration information, address information, etc. that is written to the user interface of the memory controller during operation.

Figure 8:
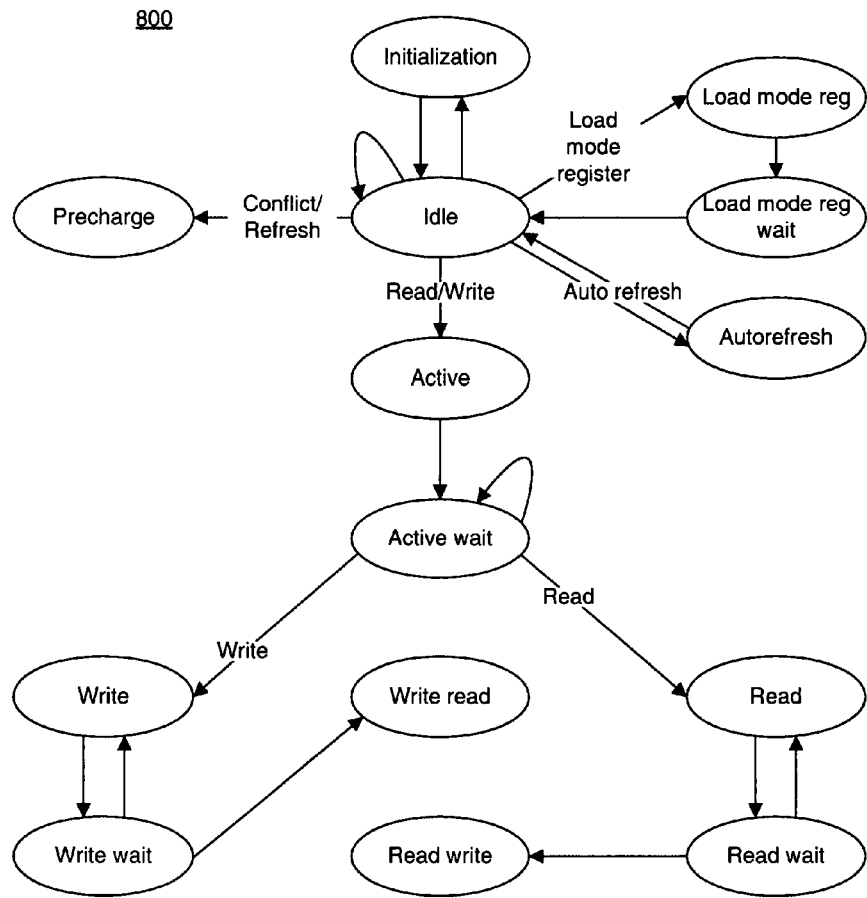
FIG. 8 is a first state diagram illustrating the functionality of the core controller of FIG. 1 in accordance with another embodiment of the present invention.

FIGS. 8-11 are state diagrams which generally illustrate the functionality of various state machines that can be implemented within the core controller responsive to values written to the configuration register of the user interface. The values, as noted, can specify the particular type of DRAM connected to the memory controller, and thus, select the state machine that should be implemented to facilitate communication with the specified type of DRAM. FIG. 8 is a state diagram 800 illustrating state machine functionality of the core controller of FIG. 1 in accordance with one embodiment of the present invention. The diagram 800 illustrates those state transitions performed by the core controller which can be implemented for various DRAM types including, but not limited to, SDRAM, DDR, DDR2, etc.

Figure 9:
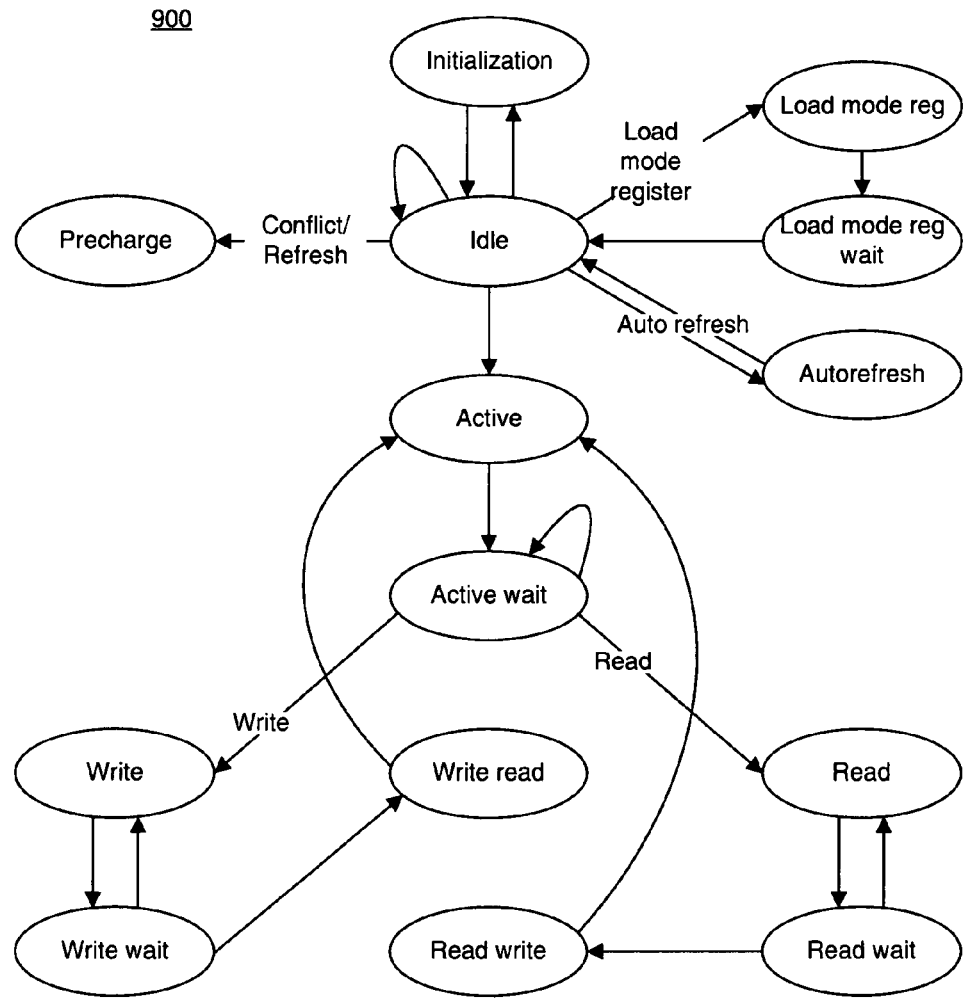
FIG. 9 is a second state diagram illustrating the functionality of the core controller of FIG. 1 in accordance with another embodiment of the present invention.

FIG. 9 is a state diagram 900 illustrating functionality of the core controller of FIG. 1 in accordance with another embodiment of the present invention. The diagram 900 illustrates state machine transitions that can be performed by the core controller for interfacing with SDRAM type memory.

Figure 10:
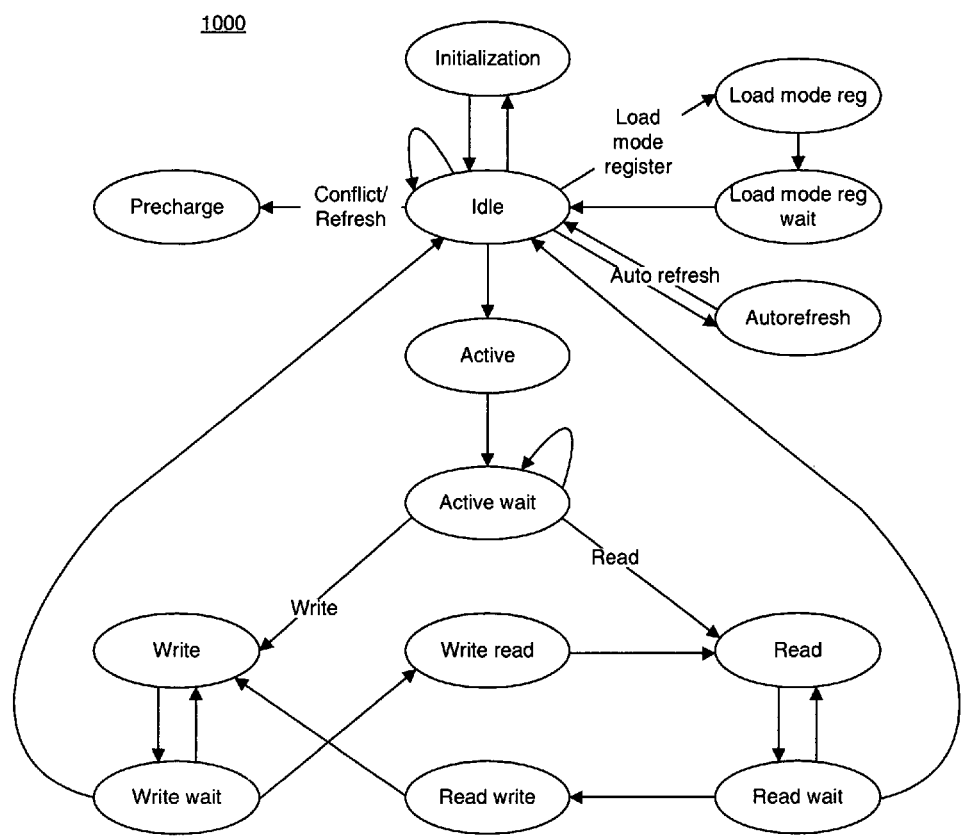
FIG. 10 is a third state diagram illustrating the functionality of the core controller of FIG. 1 in accordance with another embodiment of the present invention.

FIG. 10 is a state diagram 1000 illustrating functionality of the core controller of FIG. 1 in accordance with another embodiment of the present invention. The diagram 1000 illustrates state machine transitions that can be performed by the core controller when interfacing with DDR type memory.

Figure 11:
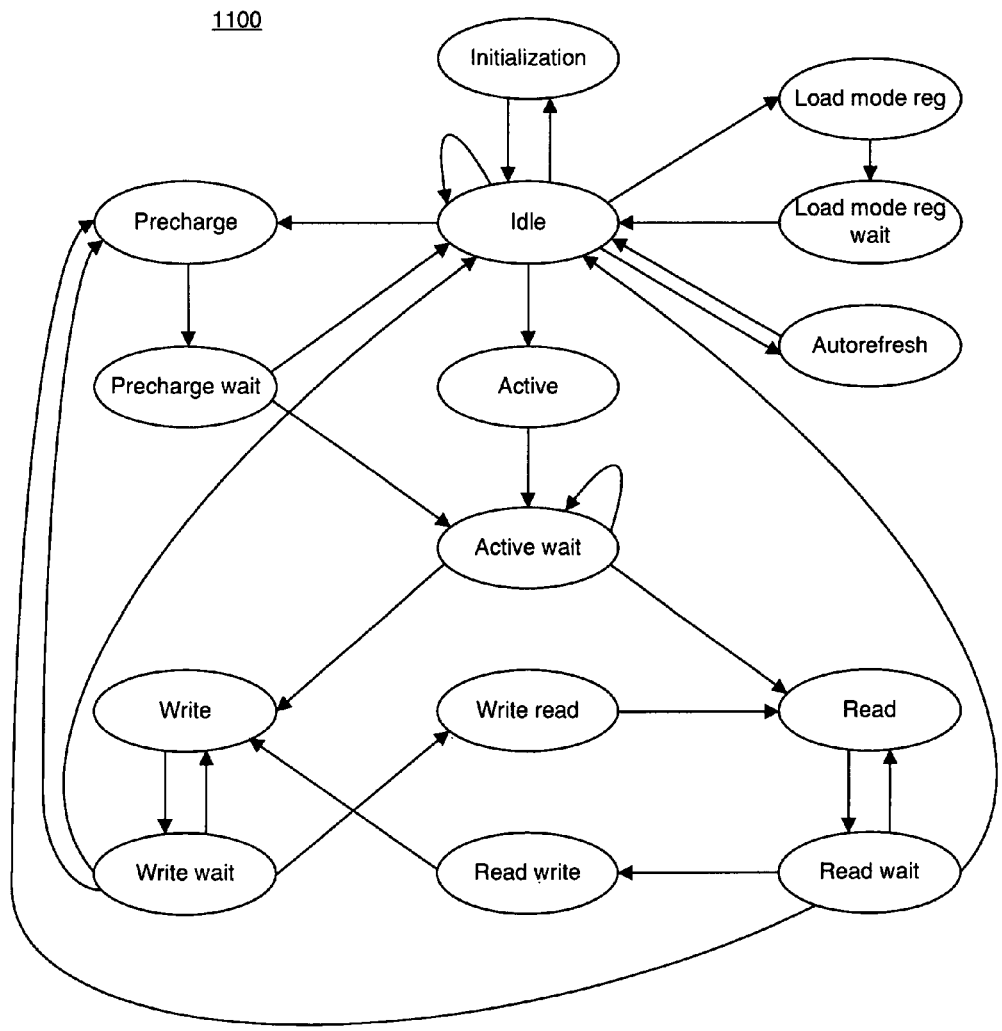
FIG. 11 is a fourth state diagram illustrating the functionality of the core controller of FIG. 1 in accordance with another embodiment of the present invention.

FIG. 11 is a state diagram 1100 illustrating functionality of the core controller of FIG. 1 in accordance with another embodiment of the present invention. The diagram 1100 illustrates state machine transitions that can be performed by the core controller when interfacing with DDR2 type memory.

Figure 12:
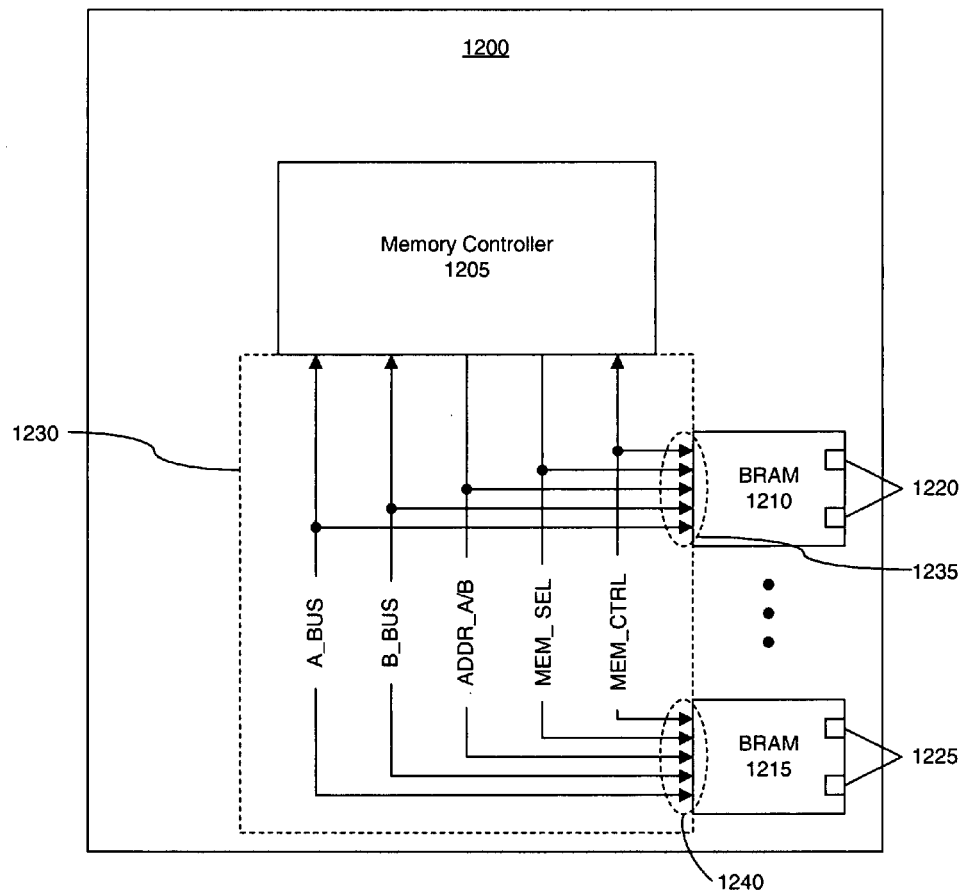
FIG. 12 is a block diagram illustrating a memory controller configured in accordance with another embodiment of the present invention.

FIG. 12 is a block diagram illustrating a memory controller 1205 configured in accordance with another embodiment of the present invention. The memory controller 1205 can be configured, for example, in a manner similar to the memory controller discussed with reference to FIG. 1. For example, the memory controller 1205 can be implemented as a hard block within a PLD 1200, such as an FPGA. Further, the memory controller 1205 can include a user interface, a core controller, and a physical layer (not shown).

The embodiment pictured in FIG. 12 can include one or more BRAMs such as BRAM 1210 and BRAM 1215. Each of the BRAMs 1210 and 1215 can be configured to include a plurality of ports. As is well known, BRAMs typically are implemented as dual port devices. Accordingly, BRAM 1210 can include dual ports 1220 and BRAM 1215 can include dual ports 1225. The dual ports 1220 and 1225 allow each respective BRAM 1210 and 1215 to interface with the PLD fabric.

A memory controller bus (MCB) 1230 can be established between the memory controller 1205 and the BRAM 1210 and the BRAM 1215. BRAM 1210 can include a MCB interface 1235 to connect with the MCB 1230. Similarly, the BRAM 1215 can include an MCB interface 1240 to connect with the MCB 1230. The MCB 1230 can be implemented, for example, using dedicated routing wires connecting the memory controller 1205 to BRAM 1210 and BRAM 1215.

The embodiment depicted in FIG. 12 facilitates clock domain translation from the typically higher frequencies at which the memory controller 1205 and DRAM operate to the lower frequencies at which the PLD fabric operates, and vice versa. In accordance with the embodiment illustrated in FIG. 12, data can be exchanged between the BRAM 1210, BRAM 1215, and the DRAM directly via the physical layer of the memory controller 1205, bypassing the user interface.

The memory control signal (MEM_CTRL) of the MCB interface 1230 can be a bi-directional signal that can be used by the BRAM(s) 1210 and/or 1215 to gain access to the memory controller 1205 or can be used by the memory controller 1205 to gain access to the BRAM(s) 1210 and/or 1215. The memory select signal (MEM_SEL) of the MCB interface 1230 can select the particular BRAM to which data is to be written or from which data is to be read. The address signal (ADDR_A/B) can specify the addressing information for both data bus A (A_BUS) and data bus B (B_BUS).

In one embodiment, a counter based access to the memory control and memory select signals can be implemented to build a token passing arbitration scheme in a distributed fashion. In another embodiment, a variable TDMA arbitration scheme can be implemented. The arbitration logic can be implemented in BRAM control logic, which can process the signals of the MCB 1230.

Figure 13:
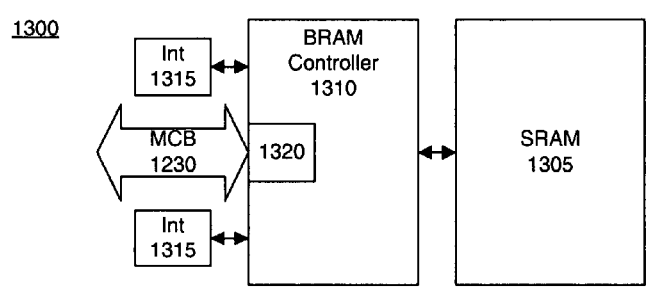
FIG. 13 is a block diagram illustrating a Block Random Access Memory in accordance with another embodiment of the present invention.

FIG. 13 is a block diagram illustrating a BRAM 1300 in accordance with another embodiment of the present invention. The BRAM 1300 can be used with a memory controller as pictured in FIG. 12, for example. As shown, the BRAM 1300 can include an SRAM module 1305, a BRAM controller 1310, as well as the interconnect interface 1315 to the PLD fabric. The interconnect interface 1315 can include the dual port logic. The BRAM controller 1310 also can include an MCB interface 1320 for linking the BRAM controller 1310 with the MCB 1230. The BRAM controller 1310 can arbitrate between the MCB 1230 and the interconnect interface 1315.

In one embodiment, each BRAM can represent a single port. The number of BRAMs can correspond to the number of ports connected to the memory controller. It should be appreciated, however, that a plurality of BRAMs can be aggregated together to form a larger BRAM module which can be viewed, or considered, a single port if need be. The fabric of the PLD can be used to implement the arbitration scheme which instructs the hard multiplexer(s) of the memory controller to direct the read and write bus to a particular BRAM in a given memory controller cycle. Though the arbitration scheme can be implemented within the PLD fabric to switch to a selected BRAM during runtime, as noted, the MCB 1230 can be implemented using dedicated routing resources.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising, i.e., open language. The term "coupled", as used herein, is defined as connected, although not necessarily directly, and not necessarily mechanically, e.g., communicatively linked through a communication channel or pathway or another component or system.

This invention can be embodied in other forms without departing from the spirit or essential attributes thereof. Accordingly, reference should be made to the following claims, rather than to the foregoing specification, as indicating the scope of the invention.

What is claimed is:

1. A memory controller, comprising:
   a user interface comprising a command register and a plurality of data First-In-First-Out (FIFO) memories, wherein the command register receives a first address of a data FIFO memory of the plurality of data FIFO memories, and wherein the first address is provided from circuitry external to the memory controller;
   a core controller coupled to the user interface, wherein responsive to an instruction from the user interface, the core controller generates control signals that initiate an operation within a memory device coupled to the core controller; and
   a physical layer that couples with the core controller, the user interface, and the memory device, wherein, responsive to a read operation of the memory device, the physical layer stores data received from the memory device within a first data FIFO memory selected from the plurality of data FIFO memories according to the first address.

2. The memory controller of claim 1, wherein the physical layer, responsive to a write operation of the memory device, reads data from a second data FIFO memory selected from the plurality of data FIFO memories according to a second address received in the command register provided from the circuitry external to the memory controller and writes the data into the memory device.

3. The memory controller of claim 1, wherein the memory controller is implemented as a hard block within a programmable integrated circuit, and wherein a plurality of input/output blocks (IOBs) of the programmable integrated circuit are selectively available for use by either the memory controller or a user-circuit design implemented within a programmable fabric portion of the programmable integrated circuit.

4. The memory controller of claim 1, wherein the circuitry external to the memory controller is user-specified circuitry implemented within a programmable fabric portion of a programmable integrated circuit that comprises the memory controller.

5. The memory controller of claim 1, wherein the command register comprises an acknowledgement bit that is set according to whether a write operation that writes data from a second selected data FIFO memory of the plurality of data FIFO memories to the memory device is successful.

6. The memory controller of claim 5, wherein the core controller sends an acknowledgement message to the second selected data FIFO memory responsive to the acknowledgement bit of the command register indicating a successful write operation to the memory device.

7. The memory controller of claim 1, wherein, for each read operation of the memory device, the physical layer stores data from the memory device within one of the plurality of data FIFO memories according to an address stored in the command register for each respective read operation.

8. The memory controller of claim 7, wherein the address stored in the command register is dynamically determined during operation of the memory controller.

9. The memory controller of claim 1, wherein a number of FIFO memories used by the memory controller is dynamically changed responsive to a reset of the memory controller and a reset option.

10. A memory controller implemented within a programmable integrated circuit, the memory controller comprising:
    a user interface comprising a plurality of data first-in-first-out (FIFO) memories and a debug interface, wherein the debug interface comprises at least one output register specifying state information for each of the plurality of FIFO memories and a core controller during operation of the memory controller, wherein the debug interface provides the state information to circuitry external to the memory controller;
    the core controller coupled to the user interface, wherein responsive to an instruction from the user interface, the core controller generates control signals that initiate an operation within a memory device coupled to the core controller; and
    a physical layer that couples with the core controller, the user interface, and the memory device, wherein responsive to receiving data from the memory device, the physical layer stores the data within a data FIFO memory selected from the plurality of data FIFO memories within the user interface as indicated by an address, wherein the address is received from circuitry external to the memory controller,
    wherein the memory controller is implemented as a hard block within the programmable integrated circuit.

11. The memory controller of claim 10, wherein the at least one output register specifies an address of the selected data FIFO memory.

12. The memory controller of claim 10, wherein the at least one output register of the debug interface specifies at least one of a read counter or a write counter for a selected FIFO memory of the plurality of FIFO memories.

13. The memory controller of claim 10, wherein the at least one output register specifies a measure of an average amount of time for accessing the memory device.

14. The memory controller of claim 10, wherein the at least one output register specifies a measure of time before a selected access of the memory device specified in a command register of the user interface is completed.

15. The memory controller of claim 10, wherein the debug interface further comprises an input register receiving a value, wherein the at least one output register specifies at least one item of state information that is selected according to the value received in the input register of the debug interface.

16. The memory controller of claim 10, wherein the at least one output register specifies at least one address listed in an open row management module of the memory device.

17. The memory controller of claim 10, wherein a plurality of input/output blocks (IOBs) of the programmable integrated circuit are multiplexed to selectively connect with either the memory controller or a user-circuit design implemented within a programmable fabric portion of the programmable integrated circuit.

18. A memory controller, comprising:

a user interface comprising a command register receiving instructions;

a core controller coupled to the user interface, wherein responsive to an instruction from the user interface, the core controller generates control signals that initiate an operation within a memory device coupled to the core controller;

a physical layer that couples with the core controller, the user interface, and the memory device; and a block random access memory comprising at least three ports, wherein a first one of the at least three ports is directly coupled to the physical layer of the memory controller through a memory controller bus, wherein data exchanged with the memory device flows through the memory controller bus between the block random access memory and the physical layer while bypassing the user interface.

19. The memory controller of claim 18, wherein the memory controller is implemented as a hard block within a programmable integrated circuit, and wherein at least a second port and a third port of the block random access memory connect with a user-circuit design implemented within the programmable integrated circuit.

20. The memory controller of claim 18, wherein the memory controller is implemented within a programmable integrated circuit, and wherein a plurality of input/output blocks (IOBs) of the programmable integrated circuit are multiplexed to selectively connect with either the memory controller or a user-circuit design implemented within the programmable integrated circuit.

* * * * *